March 19, 1935.　　　L. E. BARRETT　　　1,994,806

TRACTOR STEERING APPARATUS

Filed June 21, 1933　　　2 Sheets-Sheet 1

INVENTOR.
LEO E. BARRETT
BY
ATTORNEY

March 19, 1935.  L. E. BARRETT  1,994,806
TRACTOR STEERING APPARATUS
Filed June 21, 1933  2 Sheets-Sheet 2

INVENTOR.
LEO E. BARRETT
BY
ATTORNEY

Patented Mar. 19, 1935

1,994,806

UNITED STATES PATENT OFFICE 1,994,806

TRACTOR STEERING APPARATUS

Leo E. Barrett, San Francisco, Calif., assignor of one-half to Raymond J. Hannan, San Francisco, Calif.

Application June 21, 1933, Serial No. 676,878

7 Claims. (Cl. 180—9.2)

This invention relates particularly to vehicles or tractors of the track laying type, wherein steering or directional movement is effected by driving the track laying belt on one side of the vehicle at a greater speed than the belt on the other side, which result is accomplished by "slipping" or disengaging the driving clutch connected to one track laying belt while allowing the other clutch to remain engaged. In the conventional tractor of the track laying type, the steering clutches are operated manually and a great deal of effort is required on the part of the operator to properly manipulate the same.

An object of my invention is to provide in a tractor of the track laying type, a hydraulic or fluid pressure mechanism for operating the steering clutches, whereby but very little effort is required of the vehicle operator to steer the tractor, in contrast with the conventional manual type of steering operation.

Other objects and advantages are to provide a tractor steering apparatus that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
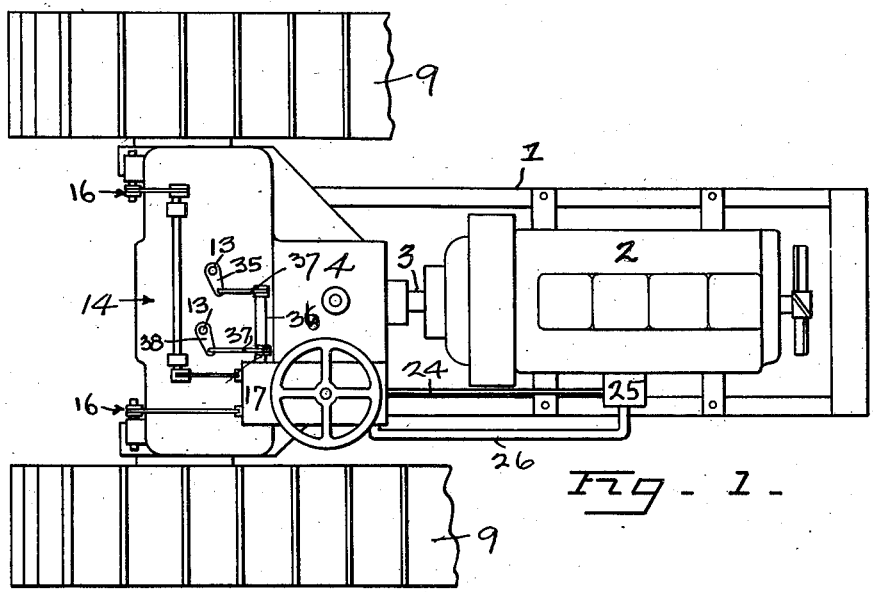
Fig. 1 represents a diagrammatic plan view of a tractor of the track laying type, having a fluid pressure steering mechanism constructed in accordance with my invention applied thereto.

In detail the construction illustrated in the drawings comprises a tractor of the well-known and conventional track laying type, which includes a frame 1 having a power unit or engine 2 arranged therein, the said engine being connected by a drive shaft 3 to a housing 4 containing a transmission, the said transmission being suitably connected to a differential mounted within the housing 5.

The differential on each of the opposite sides thereof, is connected to the clutches 6—6, and the other end of each clutch is connected to a shaft 7 which has a pinion thereon for driving a sprocket wheel 8 of the track belt 9 on each of the opposite sides of the frame 1. In the usual tractor construction each steering clutch 6 is provided with a clutch collar 10 thereon, with which a shifting fork 11 is engaged. Each shifting fork 11 is connected through a system of fulcrum levers 12 to a vertically disposed shaft 13 which extends upwardly through the housing 14 containing the differential and steering clutches.

In the larger type of tractors, it requires a great deal of effort and strength on the part of the operator, to rapidly and continuously slip or disengage the steering clutches 6. Likewise, rotative movement of either steering clutch 6 may be completely stopped by an external band brake 15, which band brake is engaged with the outer shell of the clutch thru a system of manually movable levers 16.

With my invention I provide a pair of plungers, each one of which is adapted to be operated independently of the other, whereby a selected amount of movement of each plunger will slip or disengage one of the steering clutches, and continued movement of the said plungers will cause the band brakes 15 to be applied to the outer shells of the steering clutches. By my invention each steering clutch and the band brake thereon is operated thru the medium of fluid pressure so that the only effort required by the operator of the vehicle is to regulate the flow of fluid pressure in the proper channel, whereby the pressure of the fluid will cause the steering clutches to either slip or be disengaged and to apply the brakes.

The fluid pressure steering mechanism consists of a casing 17, having a pair of like cylinders 18 and 19 therein, and preferably extending lengthwise of the casing 17. Each of the cylinders 18 and 19 is provided with an inlet port 20 at one end thereof, an intermediate outlet port 21 at the opposite end thereof, and an outlet port 22 at the extreme end thereof. The inlet ports 20 communicate with the conduit 23 which is connected by a pipe 24 to a source of fluid pressure, such as a pump 25, operated by and located adjacent the engine 2. A conduit 26 communicates the intake side of the pump 25 with an outflow port 27 on the side of the casing 17.

An annular shoulder 30 is provided in each of the cylinders 18 and 19 between the outlet ports 21 and 22. A plunger 31 is provided in each of the cylinders 18 and 19, the head 32 of said plunger being forced against the shoulder 30 by an expansion spring 33.

The shaft 34 is journaled transversely in the casing 17 and extends outwardly thru one side thereof into a link connection 37 with an arm 38 provided on one of the clutch fork operating shafts 13. A sleeve 36 is journaled around the shaft 34 and extends thru the casing 17, said sleeve having a link connection 37 with an arm 35 on the other clutch fork operating shaft 13. The underside of each of the cylinders 18 and 19 overlying the shaft 34, is slotted along the length thereof, as indicated at 39. An arm 40 is keyed to the shaft 34 beneath the cylinder 19, and said arm extends upwardly thru the slot 39 into the bore of the cylinder 19. The upper end of the arm 40 is provided with a roller 41 thereon, which is adapted to abut against the rear end of the plunger 31. A similar arm 40 is connected to the sleeve 36 and extends upwardly thru the slot 39 into the bore of the cylinder 18, and the roller on the upper end thereof abuts against the end of the plunger 31 in said cylinder. The expansion springs on each of the steering clutches 6 serve to hold the free ends of the arms 40, thru the operating mechanism connected thereto, in engagement with the plungers 31.

A guideway 42 is provided on the inner side of each of the cylinders 18 and 19, and a slide valve 43 is confined in each guide 42. The face of each slide valve 43 is provided with a toothed portion 44 thereon. A shaft 45 is journaled in a vertical position in the casing 17, and a gear 46 is keyed onto said shaft, said gear being in meshing engagement with the opposite gear racks 44 on the slide valves 43. A tension spring 47 is secured to a steering shaft 45 and to a bracket 48 in the casing 17 for the purpose of returning said gear 46 to a neutral position.

Each slide valve 44 is slotted at one end thereof, as at 49, to register with the intake port 20, the length of said slot being such that the valve 43 may close off the discharge from the cylinder thru either of the ports 21 and 22, to disengage the steering clutch and apply the brakes thereto, in the manner to be hereinafter described.

Figure 2:
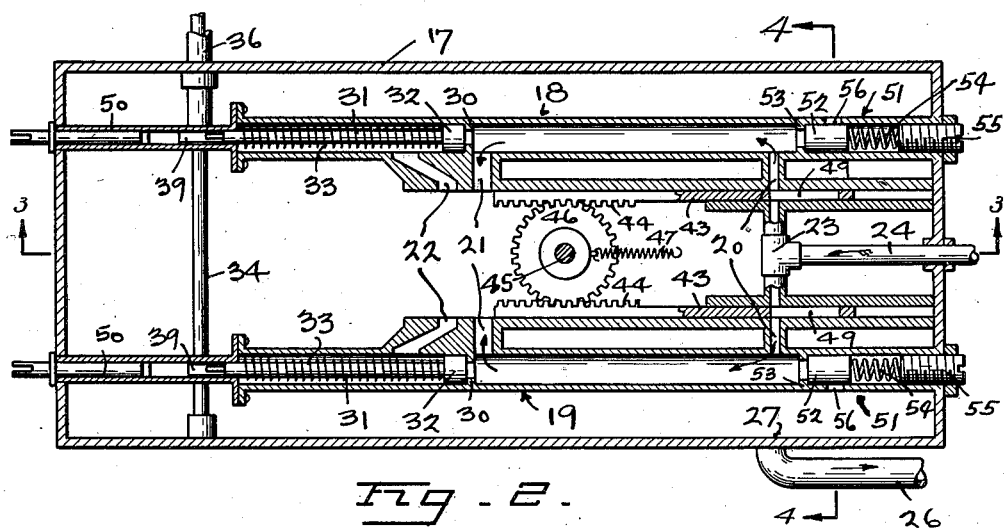
Fig. 2 is an enlarged cross section taken through my fluid pressure steering device.
Figure 6:
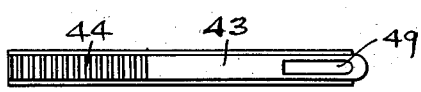
Fig. 6 is a side elevation of one of the control valves.
Figure 3:
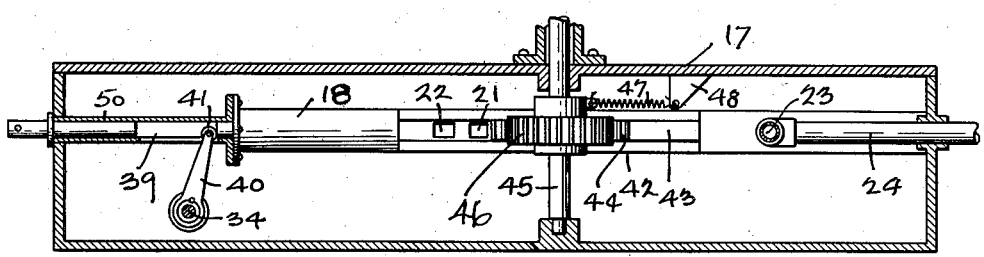
Fig. 3 is a section taken through Fig. 2 on the line 3—3.
Figure 4:
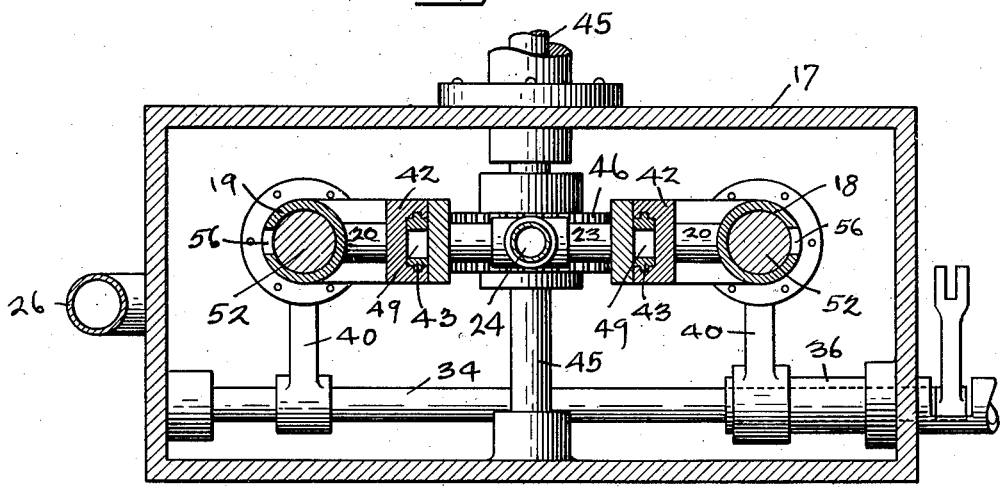
Fig. 4 is an enlarged cross section taken through Fig. 2 on the line 4—4.
Figures 5, 7:
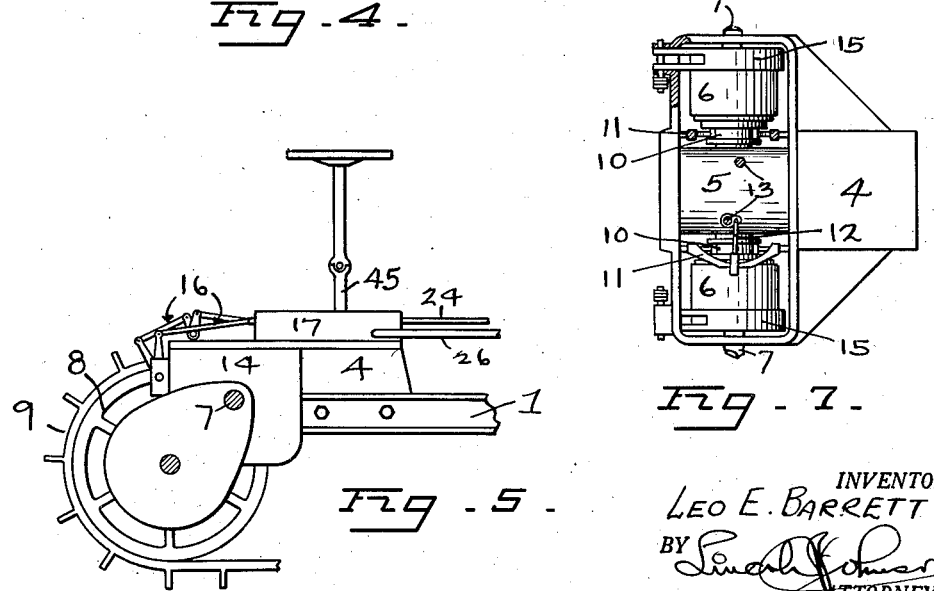
Fig. 5 is a diagrammatic side elevation of an end of a tractor showing my invention applied thereto.
Fig. 7 is a fragmentary plan view of the interior of the housing containing the driving mechanism for the track laying apparatus, and showing the clutch and brake operating members applied thereto.

In the operation of my steering apparatus, with the parts shown in the position indicated in Fig. 2, fluid under pressure from the pipe 24 flows thru the slot 49 in the valve 43, into each of the cylinders 18 and 19, thence outwardly thru the intermediate discharge port 21 into the casing 17. In order to steer the tractor, the steering shaft 45 is rotated, whereby one slide valve 43 would be moved in one direction to partially or completely block off the intermediate outlet port 21, while the other slide valve 43 would block off the intake port 20. The cylinder in which the intermediate outlet port 21 would be partially blocked off by the valve 43, would gradually accumulate fluid under pressure therein, which pressure would cause the plunger 31 therein to move axially and to thereby swing the arm 40 in an arcuate path, and thereby transmit movement thru the link mechanism 37 to the corresponding steering clutch, and cause said clutch to be either "slipped" or entirely disengaged. The force of the fluid pressure working against the plunger 31 would cause it to move against the tension of the spring 33.

By regulating the extent to which the slide valve 43 may block off the intermediate outlet port 21, the degree of slippage or disengagement of the connected and related steering clutch, is thus controlled. If the intermediate outlet port 21 is completely closed off, then the fluid pressure will cause the plunger 31 to uncover the outlet port 22 and thus by-pass the fluid into the casing 17. When the plunger 31 is moved into a position to uncover the outlet port 22, the corresponding steering clutch is placed in a completely disengaged position. Thus, the operator may control the slippage or disengagement of the clutch by the extent to which the intermediate outlet port 21 is blocked off, and the pressure accumulated in each of the cylinders 18 and 19 performs the work of disengaging the clutches, theretofore manually performed by the vehicle operator.

In order to apply the external band brake to either steering clutch, to retard rotation thereof, the operator turns the steering shaft 45, whereby either one slotted valve 43, or the other, completely blocks off both the intermediate outlet 21 and the end outlet 22. The fluid pressure thus works against the plunger 31 causing it to move rearwardly against a brake actuating piston 50 confined within the outer end of each of the cylinders 18 and 19, said piston 50 being connected by the brake operating levers 16 to one or the other of the band brakes 15. The extent of the pressure which may be exerted against the plunger 31 to apply the brakes, is regulated by an unloading mechanism 51, in each of the cylinders 18 and 19.

The pressure unloading mechanism consists of a piston 52 held against an annular shoulder 53 in each of the cylinders 18 and 19, by a compression spring 54, an adjusting screw 55 being threadedly engaged with an end of the spring 54 to regulate the tension thereon and hence to regulate the tension at which the piston 52 may move to uncover a port 56 in each of the cylinders 18 and 19, and to thus unload the accumulated pressure in said cylinders.

Ordinary directional movement of the tractor may be accurately controlled by slipping or disengaging the clutches, which operation would be accomplished by completely or partially blocking off the intermediate ports 21 by the respective valves 43.

Where it would be desirable to about face the movements of the tractor, it would be necessary to not only disengage the clutch on one of the track belts, but to also lock it by means of the band brake, whereby the entire driving torque would be transmitted from the engine to the other track laying belt. By means of the hydraulic steering and braking mechanism, the vehicle operator is spared a great deal of arduous work in steering the vehicle, as well as applying the brakes thereto, and the operation of the tractor in the field, is made comparatively simple.

In the description of the operation of the slide valves 43, as well as the plungers 31, it is to be understood that each side of the system works precisely the same as the other, and that where the description refers to only one side of the system, that it applies equally as well to the other side thereof. The arrangement of the slide valves is such that only one steering clutch at a time will be slipped or disengaged, it being obvious that by disengaging the master clutch between the engine and the transmission, that power to both track laying belts 9 may be effectively disconnected.

Having thus described this invention, what I claim and desire to secure by Letters Patent is:

1. In combination, a tractor having track laying belts on opposite sides thereof and a steering clutch for each belt and separate operators for each clutch; a brake for each clutch and an operator for each brake; of a fluid pressure operated mechanism for actuating said clutch operators and brake operators, comprising, a casing; a pair of independent cylinders in said casing, each cylinder having inlet and outlet ports therein; a plunger in each cylinder related to each clutch operator, and to each brake operator; a valve on each cylinder to selectively open and close the inlet and outlet ports; a source of fluid under pressure connected to said inlet ports; and means to operate the valves to regulate the amount of fluid pressure to be applied against the plungers for controlling the operation of the steering clutches and the brakes.

2. In combination, a tractor having track laying belts on opposite sides thereof and a steering clutch for each belt and separate operators for each clutch, of a fluid pressure operated mechanism for actuating said clutch operators, comprising, a casing; a pair of independent cylinders in said casing, each cylinder having inlet and outlet ports therein; a plunger in each cylinder related to each clutch operator; a valve on each cylinder to selectively open and close the inlet and outlet ports; a source of fluid under pressure connected to said inlet ports; means to operate the valves to regulate the amount of fluid pressure to be applied against the plungers for controlling the operation of the steering clutches; and automatic means in each cylinder to unload the fluid therein when the pressure thereof exceeds a selected maximum pressure.

3. In combination, a tractor having track laying belts on opposite sides thereof and a steering clutch for each belt and separate operators for each clutch, of a fluid pressure operated mechanism for actuating said clutch operators, comprising, a casing; a pair of independent cylinders in said casing, each cylinder having inlet and outlet ports therein; a plunger in each cylinder; means journaled in the casing connected at one end thereof to each clutch operator and related at the other end thereof to each plunger to be moved thereby; a valve on each cylinder to selectively open and close the inlet and outlet ports; a source of fluid under pressure connected to said inlet ports; and means to operate the valves to regulate the amount of fluid pressure to be applied against the plungers for controlling the operation of the steering clutches.

4. In combination, a tractor having track laying belts on opposite sides thereof and a steering clutch for each belt and separate operators for each clutch, of a fluid pressure operated mechanism for actuating said clutch operators, comprising, a casing; a pair of independent cylinders in said casing, each cylinder having inlet and outlet ports therein; a plunger in each cylinder; means journaled in the casing connected at one end thereof to each clutch operator and related at the other end thereof to each plunger to be moved thereby; a valve on each cylinder to selectively open and close the inlet and outlet ports; a source of fluid under pressure connected to said inlet ports; and means for operating said control valves simultaneously, whereby one valve is moved to close off the outlet port on one cylinder when the other valve is moved to close off the inlet port on the other cylinder to thereby direct fluid pressure against the plunger in the cylinder in which the outlet port is closed to effect the disengagement of one steering clutch and not the other.

5. In combination, a tractor having track laying belts on opposite sides thereof and a steering clutch for each belt and separate operators for each clutch; a brake for each clutch and an operator for each brake, of a fluid pressure operated mechanism for actuating said clutch operators and brake operators, comprising a casing; a pair of independent cylinders in said casing, each cylinder having inlet and outlet ports therein; a plunger in each cylinder; means journaled in the casing connected at one end thereof to each clutch operator and related at the other end thereof to each plunger to be moved thereby; means in each cylinder connected to each brake operator, said means being operated by movement of the plunger; a valve on each cylinder to selectively open and close the inlet and outlet ports; a source of fluid under pressure connected to said inlet ports; and means to operate the valves to regulate the amount of fluid pressure to be applied against the plungers for controlling the operation of the steering clutches and brakes.

6. In combination, a tractor having track laying belts on opposite sides thereof and a steering clutch for each belt and separate operators for each clutch; a brake for each clutch and an operator for each brake; of a fluid pressure operated mechanism for actuating said clutch operators and brake operators, comprising, a casing; a pair of independent cylinders in said casing, each cylinder having inlet and outlet ports therein; a plunger in each cylinder related to each clutch operator, and to each brake operator; a valve on each cylinder to selectively open and close the inlet and outlet ports; a source of fluid under pressure connected to said inlet ports; and means to operate the valves to effect a primary movement of each plunger in opposite directions to cause the disengagement of one of the steering clutches and a secondary movement of the plungers in the original directions to cause the brake to be applied on the disengaged clutch.

7. In combination, a tractor having track laying belts on opposite sides thereof and a steering clutch for each belt and separate operators for each clutch; a brake for each clutch and an operator for each brake; of a fluid pressure operated mechanism for actuating said clutch operators and brake operators, comprising, a casing; a pair of independent cylinders in said casing, each cylinder having inlet and outlet ports therein; a plunger in each cylinder related to each clutch operator, and to each brake operator; a valve on each cylinder to selectively open and close the inlet and outlet ports; a source of fluid under pressure connected to said inlet ports; and automatic means in each cylinder to unload the fluid therein when the pressure exceeds a selected maximum pressure.

LEO E. BARRETT.